United States Patent
Hallquist

(10) Patent No.: US 7,664,623 B1
(45) Date of Patent: Feb. 16, 2010

(54) EFFICIENT SIMULATION OF MANUFACTURING PROCESS OF SHAPEABLE MATERIAL USING FINITE ELEMENT ANALYSIS

(75) Inventor: John Hallquist, Livermore, CA (US)

(73) Assignee: Livermore Software Technology Corporation, Livermore, CA (US)

( * ) Notice: Subject to any disclaimer, the term of this patent is extended or adjusted under 35 U.S.C. 154(b) by 630 days.

(21) Appl. No.: 11/558,752

(22) Filed: Nov. 10, 2006

(51) Int. Cl.
*G06F 17/10* (2006.01)
(52) U.S. Cl. .............................. 703/2; 703/6; 700/117
(58) Field of Classification Search .................. 703/2, 703/6; 700/95–97, 117, 132
See application file for complete search history.

(56) References Cited

U.S. PATENT DOCUMENTS

| | | | | |
|---|---|---|---|---|
| 6,810,300 | B1 * | 10/2004 | Woltman et al. | 700/132 |
| 7,099,734 | B2 * | 8/2006 | Pieper et al. | 700/132 |
| 7,373,284 | B2 * | 5/2008 | Stabelfeldt et al. | 703/2 |
| 2004/0236457 | A1 * | 11/2004 | Stabelfeldt et al. | 700/132 |
| 2004/0236552 | A1 * | 11/2004 | Pieper et al. | 703/6 |

OTHER PUBLICATIONS

Schmahl, G. Finite Element Analysis—An Advanced Calculation of Temperature Profiles for Difficult Shapes and Conditions, Conference Record of the 2000 IEEE Industry Applications Conference, vol. 4, Oct. 2000m, pp. 2806-2810.*

* cited by examiner

*Primary Examiner*—Russell Frejd
(74) *Attorney, Agent, or Firm*—Roger H. Chu

(57) ABSTRACT

Shapeable materials of interest are modeled with a rectangular mesh having N columns and M rows of substantially similar shell elements. The shapeable materials of interest are held in tension between a sink and a source. A column of fictitious elements is added to make the mesh wrapped-around continuous. The fictitious elements are marked as inactive, while other elements are marked as active. As the simulation moves on, the active elements are marched in the product producing direction of the machinery. When a predefined distance has traveled in the simulation the present invention performs the following:

Activate inactive elements at the source;
Copy all history data including stresses from the last column of active elements to newly activated elements;
Deactivate the lead column of active elements at the sink; and
Move the set of nodal boundary conditions to newly established boundary nodes at the sink and the source.

20 Claims, 11 Drawing Sheets

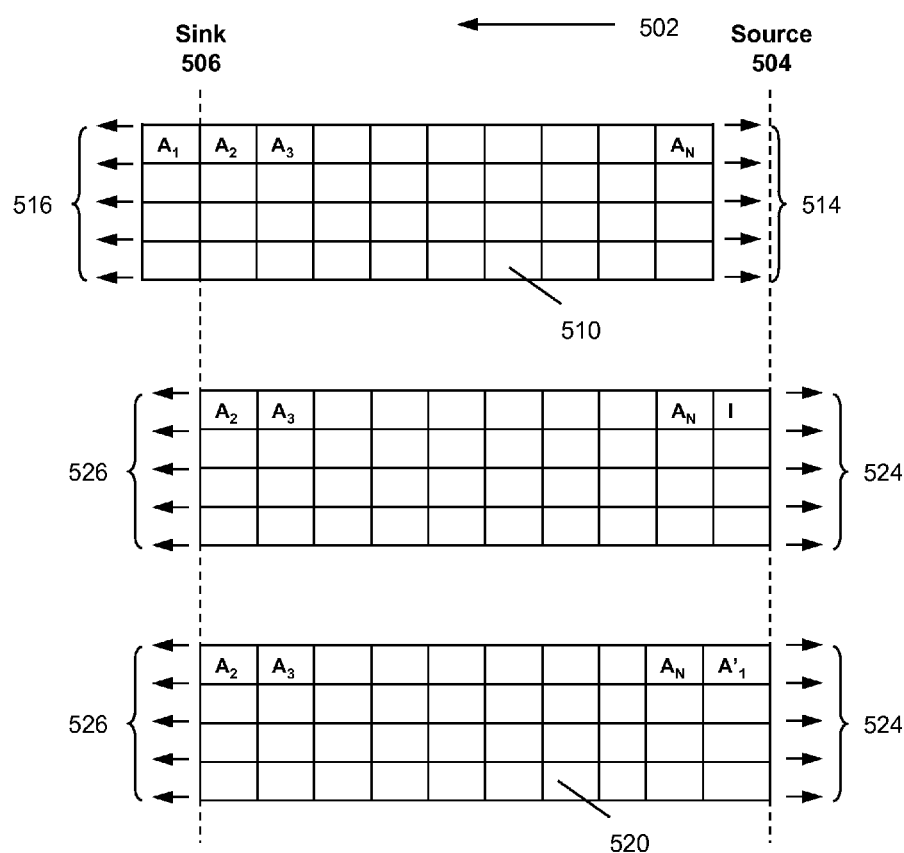

EFFICIENT SIMULATION OF MANUFACTURING PROCESS OF SHAPEABLE MATERIAL USING FINITE ELEMENT ANALYSIS

BACKGROUND

1. Field of the Invention

The present invention generally relates to a method, system and software product used in the area of mechanical computer-aided engineering design and analysis, more particularly to efficient simulation of manufacturing process of shapeable material using finite element analysis.

2. Description of the Related Art

Finite element analysis (FEA) is a computerized method widely used in industry to model and solve engineering problems relating to complex systems such as three-dimensional non-linear structural design and analysis. FEA derives its name from the manner in which the geometry of the object under consideration is specified. With the advent of the modern digital computer, FEA has been implemented as FEA software. Basically, the FEA software is provided with a model of the geometric description and the associated material properties at each point within the model. In this model, the geometry of the system under analysis is represented by solids, shells and beams of various sizes, which are called elements. The vertices of the elements are referred to as nodes. The model is comprised of a finite number of elements, which are assigned a material name to associate with material properties. The model thus represents the physical space occupied by the object under analysis along with its immediate surroundings. The FEA software then refers to a table in which the properties (e.g., stress-strain constitutive equation, Young's modulus, Poisson's ratio, thermo-conductivity) of each material type are tabulated. Additionally, the conditions at the boundary of the object (i.e., loadings, physical constraints, etc.) are specified. In this fashion a model of the object and its environment is created.

As the finite element method progressed in the past decades, not only manufactured products can be analyzed, manufacturing processes can also be simulated. For example, a diaper manufacturer would be more competitive with a more efficient manufacturing process to reduce the costs. Physical creation of a prototype manufacturing process is generally expensive and impractical, thereby a computer simulation of manufacturing process of shapeable material (e.g., paper, fabric, sheet metal, etc.) using FEA is used heavily for the manufacturer to improve the manufacturing process.

Using the diaper manufacturing process as an example, continuous shapeable materials (i.e., paper, fabric) are fed into a machine through a number of rollers. As depicted in FIG. 2A, a very simple machinery with shapeable material is illustrated. The portion of the material between rollers C and D, or E and F is of interest for the design engineer of a particular manufacturing process. In order to obtain the detailed steady state behavior of the shapeable material (e.g., FIG. 2B), not only a very fine thus large FEA mesh is required, but a sufficiently long enough time must be simulated. As a result, very large computation resource is needed to simulate a particular scenario. A design engineer usually wishes to simulate a number of scenarios (e.g., what-if study) to study the trade-offs. The large computation requirement may be solved with large number of parallel processors as described below.

One of the means to increase computing efficiency is to use parallel processing/computing in the recent years. The parallel computing has progressed such that many of the finite element analyses are performed using more than one processors (i.e., CPU). Some of the FEA are performed with a high number of the processors (e.g., 32, 64, 128 processors or more). However, in order to ensure computing efficiency, it is critical that the computation loads be balanced. Otherwise, the benefit of additional processors cannot be realized at all. When executing a FEA in a parallel computing server, a technique referred to as domain decomposition is used for load balancing, which can help achieving high computation efficiency.

When domain decomposition and other load balancing techniques are included in a FEA for simulating a manufacturing process of shapeable materials, there is an additional challenge. In applying the domain decomposition, which is done at the beginning of the simulation, a subset of elements is distributed to each processor. When the shapeable materials are fed into the machinery continuously, and only certain portions of the shapeable materials are of interest, an efficient simulation using FEA requires activating elements at the input and deactivating elements at the output. However, inactive elements would destroy the load balancing since the processors where these elements reside do not have work to do hence idle. It is therefore desirable to have an efficient new method to simulate a manufacturing process of shapeable materials using finite element analysis in a parallel computing server where all processors contain nearly equal numbers of active elements and a small number of inactive elements.

SUMMARY

This section is for the purpose of summarizing some aspects of the present invention and to briefly introduce some preferred embodiments. Simplifications or omissions in this section as well as in the abstract and the title herein may be made to avoid obscuring the purpose of the section. Such simplifications or omissions are not intended to limit the scope of the present invention.

The present invention discloses a system, method and software product for efficient simulation of a manufacturing process of a shapeable material using finite element analysis (FEA). According to one aspect, the finite element model of the machinery along with the shapeable materials is created based on user definitions. The shapeable materials are modeled with a substantially regular FEA mesh comprising a plurality of shell elements arranged rows and columns to form a sheet of moving shapeable materials as shown in FIG. 2C. At least one portion of the shapeable materials is held in tension between two locations (i.e., rollers) of the machinery. Each pair of the two locations are marked or defined as a source and a sink. The sink and the source are represented by a column of respective elements in the initial configuration. The tension is modeled as a set of nodal boundary conditions applied at nodes of the elements representing the source and the sink.

According to another aspect, instead of activating predefined elements at the source and deactivating elements at the sink, the number of elements between the sink-source pair is held constant. An additional column of fictitious elements is created connecting the sink to the source to make the FEA mesh continuous as shown in FIGS. 4A and 4B. The column of the fictitious elements is marked as inactive, while the elements representing the shapeable materials between the sink and the source are marked as active. As the simulation moves on, the active elements are marched in the direction the machinery is set up to produce the final product such as diaper or newspaper, etc. At each solution cycle, the distance that the FEA mesh has traveled is checked. When a pre-defined distance (e.g., a particular percentage of average width of the active elements) is reached, then the present invention performs the following operations:
1) Activate the column of inactive elements at the source;
2) Copy all history data including the stresses from the last column of active elements to the newly active elements;
3) Deactivate the lead column of the active elements at the sink so that they become inactive; and
4) Move the nodal boundary conditions to the newly established boundary nodes at the sink and the source.

As a result, this continuous FEA mesh with the moving nodal boundary conditions can efficiently and effectively simulate the constant moving sheet of shapeable materials in a conveyer belt of the machinery without destroying load balancing in a multi-processor parallel computing.

According to one embodiment, the present invention is a method for simulating manufacturing process of shapeable materials using a finite element analysis (FEA), the method comprises at least the following: (a) receiving definitions of machinery and the shapeable materials; (b) creating a FEA mesh representing the shapeable materials, wherein the FEA mesh comprises of N columns and M rows of substantially similar sized active shell elements; (c) defining at least one pair of sink and source representing a boundary of each portion of the shapeable materials of interest in the machinery; (d) creating at least one column of inactive shell elements, each connecting the at least pair of sink and source, respectively; (e) updating a simulation time and calculating a solution at the simulation time; (f) if the FEA mesh has traveled more than a pre-defined distance, performing an element rotation operation between the active and the inactive elements at the sink and the source; and (g) repeating (e)-(f) until the solution has reached steady state. According to another embodiment, the method further includes at least the following: activating the inactive elements at the source; copying all history data including stresses from last column of active elements to the newly activated elements; deactivating lead column of the active elements at the sink so that the lead column becomes inactive; and moving the nodal boundary conditions to new boundary nodes of the sink and the source.

One of the objects, features, and advantages of the present invention is to allow simulation of manufacturing process of shapeable materials very efficient using finite element analysis in a multi-processor parallel computing environment. Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

FIGS. 5A-5E show an element rotation operation during a simulation of an exemplary manufacturing process of shapeable materials in accordance with one embodiment of the present invention.

DESCRIPTION

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1A-6. However, those skilled in the art will readily appreciate that the detailed description given herein with respect to these figures is for explanatory purposes as the invention extends beyond these limited embodiments.

Figure 1A:
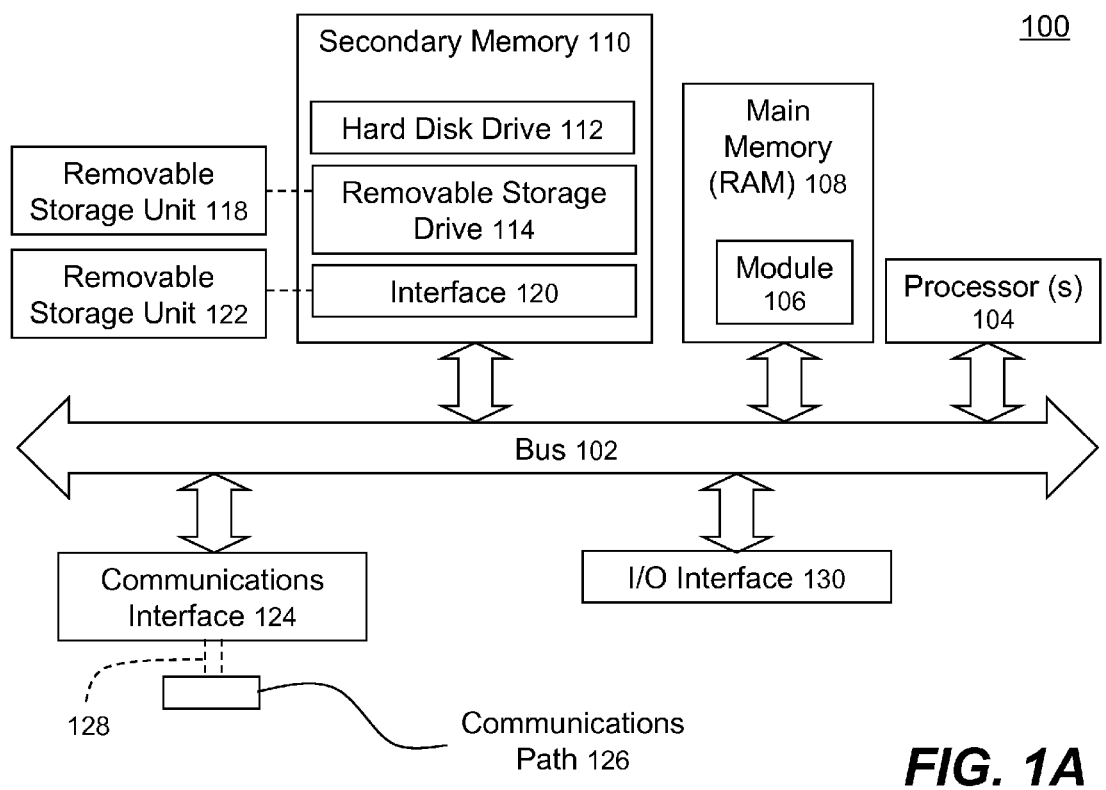
FIG. 1A is a block diagram depicting an exemplary computer, in which one embodiment of the present invention may be implemented.

Referring now to the drawings, in which like numerals refer to like parts throughout several views. The present invention may be implemented using hardware, software or a combination thereof and may be implemented in a computer system or other processing system. In fact, in one embodiment, the invention is directed towards one or more computer systems capable of carrying out the functionality described herein. An example of a computer system 100 is shown in FIG. 1A. The computer system 100 includes one or more processors, such as processor 104. The processor 104 is connected to a computer system internal communication bus 102. Various software embodiments are described in terms of this exemplary computer system. After reading this description, it will become apparent to a person skilled in the relevant art(s)

how to implement the invention using other computer systems and/or computer architectures.

Computer system 100 also includes a main memory 108, preferably random access memory (RAM), and may also include a secondary memory 110. The secondary memory 110 may include, for example, one or more hard disk drives 112 and/or one or more removable storage drives 114, representing a floppy disk drive, a magnetic tape drive, an optical disk drive, etc. The removable storage drive 114 reads from and/or writes to a removable storage unit 118 in a well-known manner. Removable storage unit 118, represents a floppy disk, magnetic tape, optical disk, etc. which is read by and written to by removable storage drive 114. As will be appreciated, the removable storage unit 118 includes a computer usable storage medium having stored therein computer software and/or data.

In alternative embodiments, secondary memory 110 may include other similar means for allowing computer programs or other instructions to be loaded into computer system 100. Such means may include, for example, a removable storage unit 122 and an interface 120. Examples of such may include a program cartridge and cartridge interface (such as that found in video game devices), a removable memory chip (such as an EPROM, universal serial bus USB flash memory, or PROM) and associated socket, and other removable storage units 122 and interfaces 120 which allow software and data to be transferred from the removable storage unit 122 to computer system 100. In general, Computer system 100 is controlled and coordinated by operating system (OS) software, which performs tasks such as process scheduling, memory management, networking and I/O services. Exemplary OS includes Linux®, Microsoft Windows®.

There may also be a communications interface 124 connecting to the bus 102. Communications interface 124 allows software and data to be transferred between computer system 100 and external devices. Examples of communications interface 124 may include a modem, a network interface (such as an Ethernet card), a communications port, a PCMCIA slot and card, etc. Software and data transferred via communications interface 124 are in the form of signals 128 which may be electronic, electromagnetic, optical, or other signals capable of being received by communications interface 124. These signals 128 are provided to communications interface 124 via a communications path (i.e., channel) 126. This channel 126 carries signals (or data flows) 128 and may be implemented using wire or cable, fiber optics, a phone line, a cellular phone link, an RF link, a Bluetooth® wireless link and other communications channels.

The channel 126 facilitates a data flow 128 between a data network and the computer 100 and typically executes a special set of rules (i.e., a protocol) to send data back and forth. One of the common protocols is TCP/IP (Transmission Control Protocol/Internet Protocol) commonly used in the Internet. In general, the communication interface 124 manages the assembling of a data file into smaller packets that are transmitted over the data network or reassembles received packets into the original data file. In addition, the communication interface 124 handles the address part of each packet so that it gets to the right destination or intercepts packets destined for the computer 100.

In this document, the terms "computer program medium" and "computer usable medium" are used to generally refer to media such as removable storage drive 114, a hard disk installed in hard disk drive 112, and signals 128. These computer program products are means for providing software to computer system 100. The invention is directed to such computer program products.

The computer system 100 may also include an I/O interface 130, which provides the computer system 100 to access monitor, keyboard, mouse, printer, scanner, plotter, and alike.

Computer programs (also called computer control logic) are stored as application modules 106 in main memory 108 and/or secondary memory 110. Computer programs may also be received via communications interface 124. Such computer programs, when executed, enable the computer system 100 to perform the features of the present invention as discussed herein. In particular, the computer programs, when executed, enable the processor 104 to perform features of the present invention. Accordingly, such computer programs represent controllers of the computer system 100.

In an embodiment where the invention is implemented using software, the software may be stored in a computer program product and loaded into computer system 100 using removable storage drive 114, hard drive 112, or communications interface 124. The application module 106, when executed by the processor 104, causes the processor 104 to perform the functions of the invention as described herein.

The main memory 108 may be loaded with one or more application modules 106 that can be executed by one or more processors 104 with or without a user input through the I/O interface 130 to achieve desired tasks. In operation, when at least one processor 104 executes one of the application modules 106, the results are computed and stored in the secondary memory 110 (i.e., hard disk drive 112). The status of the finite element analysis is reported to the user via the I/O interface 130 either in a text or in a graphical representation. For example, users can determine whether shapeable materials in a manufacturing process has reached steady by inspecting or examining the shape of the materials in graphical form.

In one embodiment, an application module 106 is configured to facilitate the creation of a finite element analysis model to represent a structure to be simulated. The module 106 allows the user to define machinery along with the shapeable material in a manufacturing process. In another embodiment, an application module 106 is configured to facilitate the creation of fictitious elements between the sink and the source. In yet another embodiment, an application module 106 is configured to facilitate the determination of moving the inactive elements to active at the source and of moving the leading active elements to inactive at the sink. In yet still another embodiment, an application module 106 is configured to facilitate the moving boundary conditions at the sink and the source.

Figure 1B:
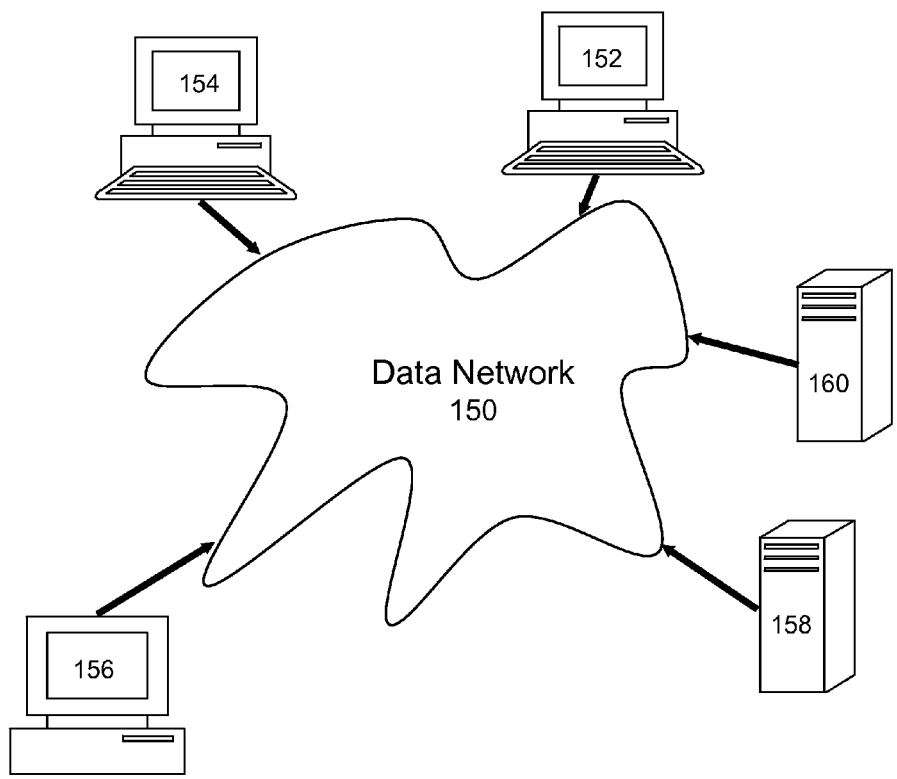
FIG. 1B is a diagram showing an exemplary network environment that one embodiment of the present invention may be deployed.

FIG. 1B depicts a networked computing environment 140, in which one embodiment of the present invention may be practiced. A plurality of network capable computing devices 152, 154, 156, 158 and 160 (e.g., the computer device 100 described in FIG. 1A) are coupled to a data network 150. These computing devices 152-160 can communicate with each other via the network 150. The data network 150 may include, but is not limited to, the Internet, an Intranet, local area network (LAN), wide area network (WAN), a wireless network or a data network comprises of public and private networks. In one embodiment, a software module (e.g., 106 in FIG. 1A) for a finite element analysis may be configured and executed on a computing device 158, while the pre- and post-processing of the simulation are conducted on another computing device 156 by users/engineers. The input file and the output results file are transmitted over the data network 150 between the computing device 158 and the computing device 156. During the execution of the application module, the user may be able to monitor the progress of the analysis at another computing device 154. One exemplary implementation of this technique is included in a suite of engineering analysis computer software products, LS-PREPOST® and LS-DYNA®, offered by Livermore Software Technology Corporation, Livermore, Calif., USA.

Figure 2A:
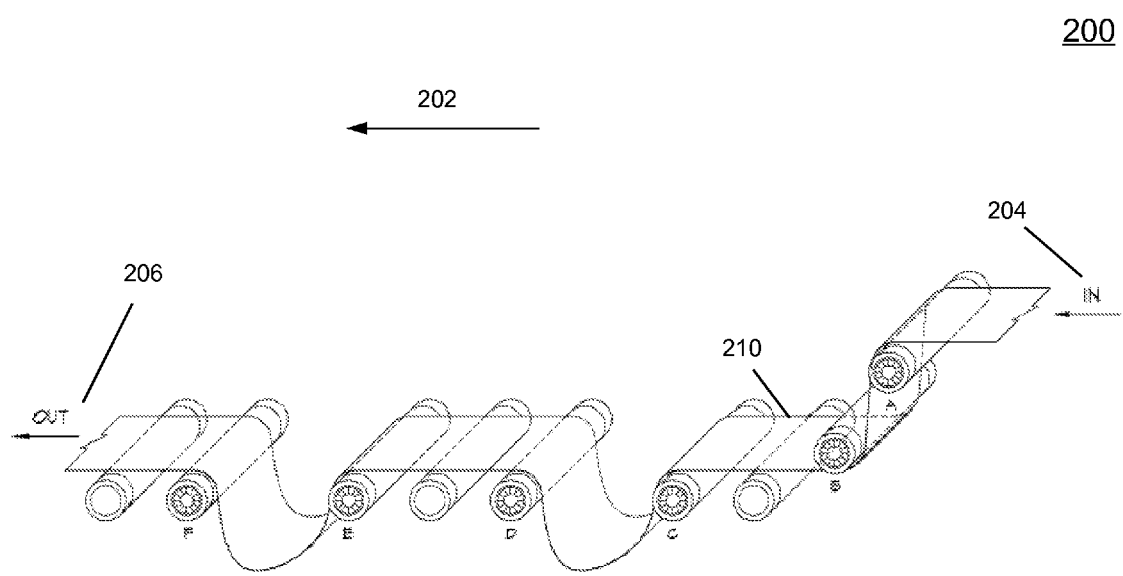
FIG. 2A is an exemplary machinery using shapeable materials.

FIG. 2A is an exemplary machinery using shapeable materials. The machinery 200 includes six rollers A, B, C, D, E, and F. The shapeable materials (e.g., paper, fabric, sheet metal, etc.) 210 is fed into the machinery at 204 and the final product or output at 206. The shapeable materials 210 travel in the direction indicated by the arrow 202. The present invention pertains to a method and system for efficiently simulation a manufacturing process using the machinery configuration such as the machinery 200.

Figure 2B:
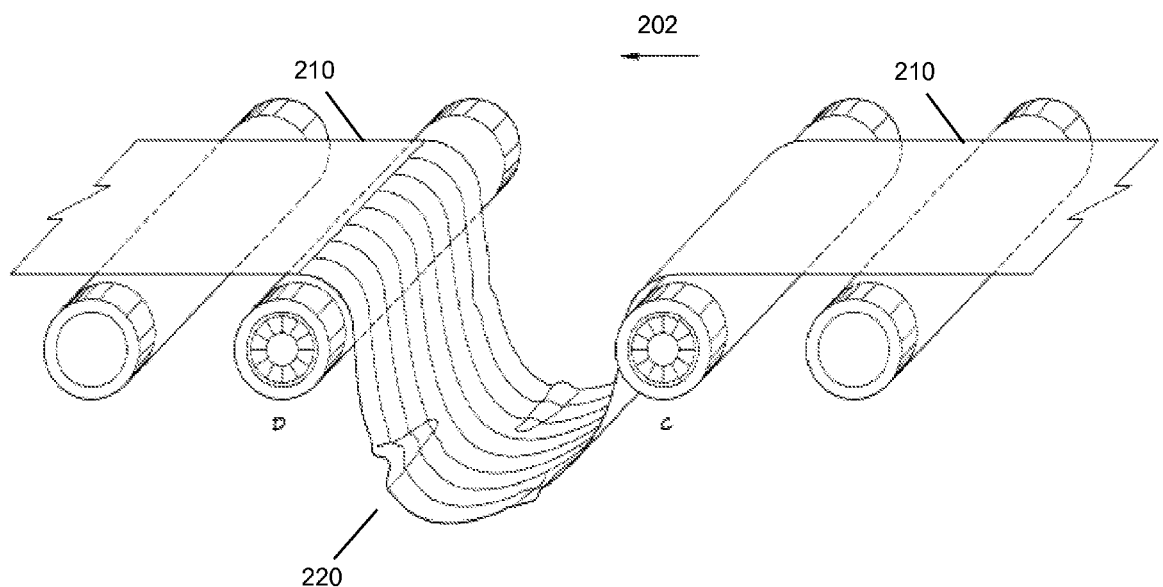
FIG. 2B shows the shapeable materials of interest in the machinery of FIG. 2A.

FIG. 2B shows the shapeable materials 210 of interest in the machinery 200 of FIG. 2A. Each portion of the materials between two rollers (e.g., rollers C and D, E and F) is of interest to the design engineer. The steady state solution shown in FIG. 2B is an example of how a more efficient manufacturing process can be designed. In this example, the shapeable materials between rollers C and D are studied. The wrinkles 220 are part of the steady state solution after certain amount of the time in the simulation.

Figure 2C:
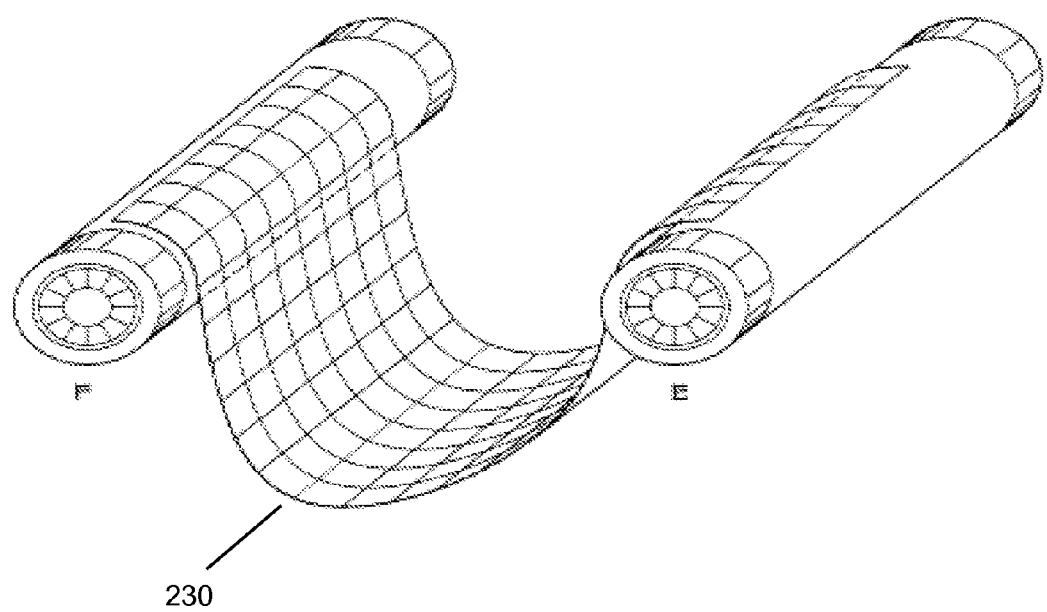
FIG. 2C shows an exemplary finite element mesh representing the shapeable materials between rollers E and F of FIG. 2B.

FIG. 2C shows an exemplary finite element mesh 230 representing the shapeable materials between rollers E and F of FIG. 2B. Since creation of prototype of a manufacturing process is expensive thus not feasible, a simulation using finite element analysis is desired. An exemplary finite element mesh 230 is depicted in FIG. 2C. It is shown that a mesh with substantially regular sized elements is used to represent shapeable materials 210 between rollers E and F.

Figure 3:
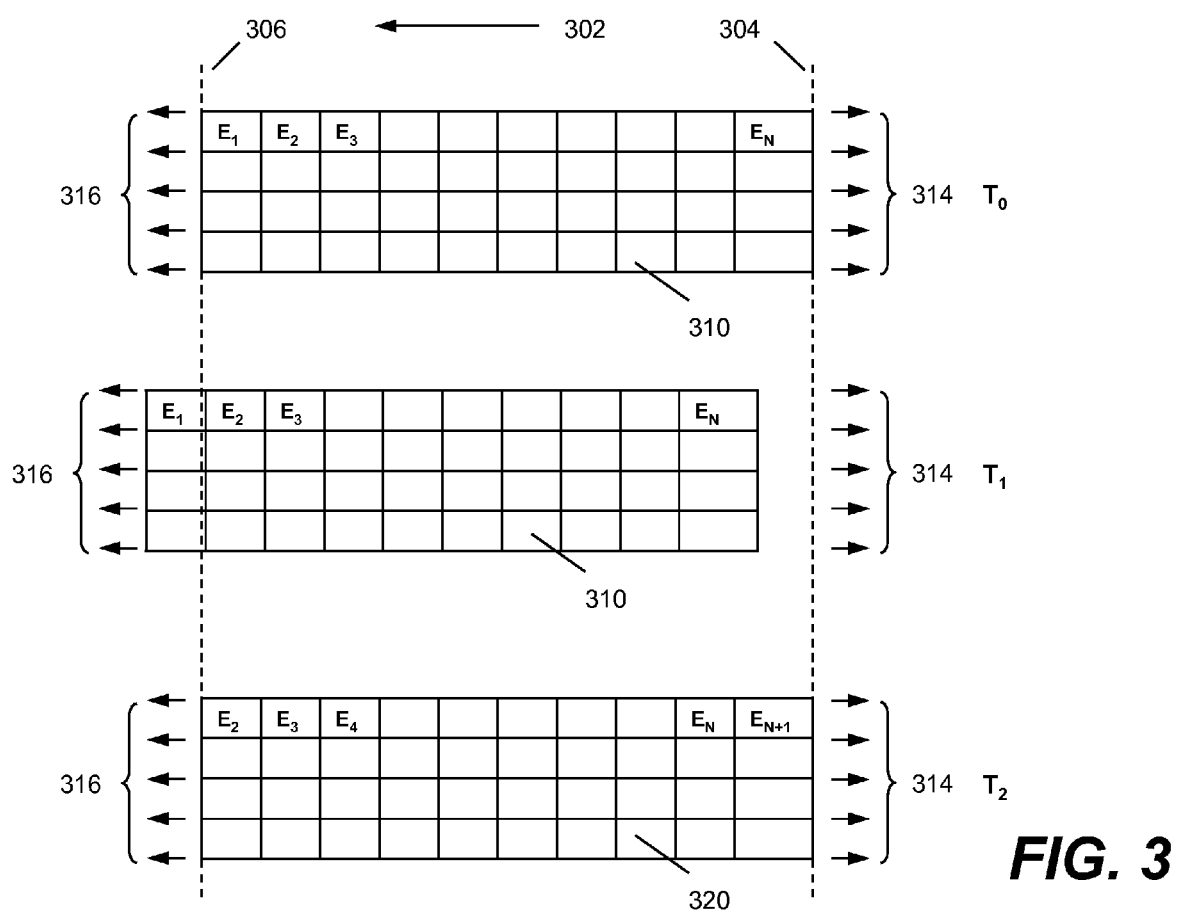
FIG. 3 shows flattened views of the finite element mesh in three different stages of simulation of the manufacturing process in a traditional approach.

FIG. 3 shows flattened views of the finite element mesh in three different stages at $T_0$, $T_1$, and $T_2$ of simulation of a manufacturing process of shapeable materials in a traditional approach. The shapeable materials travel in a direction indicated by the arrow 302. The portion of interest is located between an incoming location 304 and an outgoing location 306. Physically the shapeable materials are fed into the incoming location 304 and moved out of the outgoing location 306 continuously (e.g., the materials between roller C and D, or E and F of FIG. 2A). In the beginning of the simulation at $T_0$, the shapeable materials are represented by an exemplary FEA mesh 310, which has N columns and M rows of shell elements. Both N and M are positive integers. In order not to overcrowd the figure, there are only four rows in the mesh 310 as shown in FIG. 3. The present invention does not set a limit regarding the number of columns and rows of shell elements representing the shapeable material. The mesh 310 is under tension, which is applied at two sides 314 and 316 of the mesh 310. The elements are referred to as $E_1$ column, $E_2$ column, $E_3$ column, . . . , $E_N$ column from the sink to the source, respectively. Later on in the simulation at $T_1$, the shapeable materials are still represented by the mesh 310, but the mesh 310 has traveled to a different position. The $E_1$ column or the lead column of elements has almost traveled passed the outgoing location 306. In order to simulate this manufacturing process further, the traditional approach is to deactivate the $E_1$ column and activate a new $E_{N+1}$ column of elements at the incoming location 304 at time $T_2$, which is generally at the next solution cycle right after $T_1$. As a result, the simulation continues with the new FEA mesh 320 at $T_2$, and the same process of deactivating and activating column of shell elements as the shapeable materials march forward until a steady state has reached. This traditional approach creates a big problem with the modern FEA executed in parallel computing servers, as the constantly activating and deactivating elements destroy the load balancing. The present invention uses an approach described in the following sections.

Figure 4A:
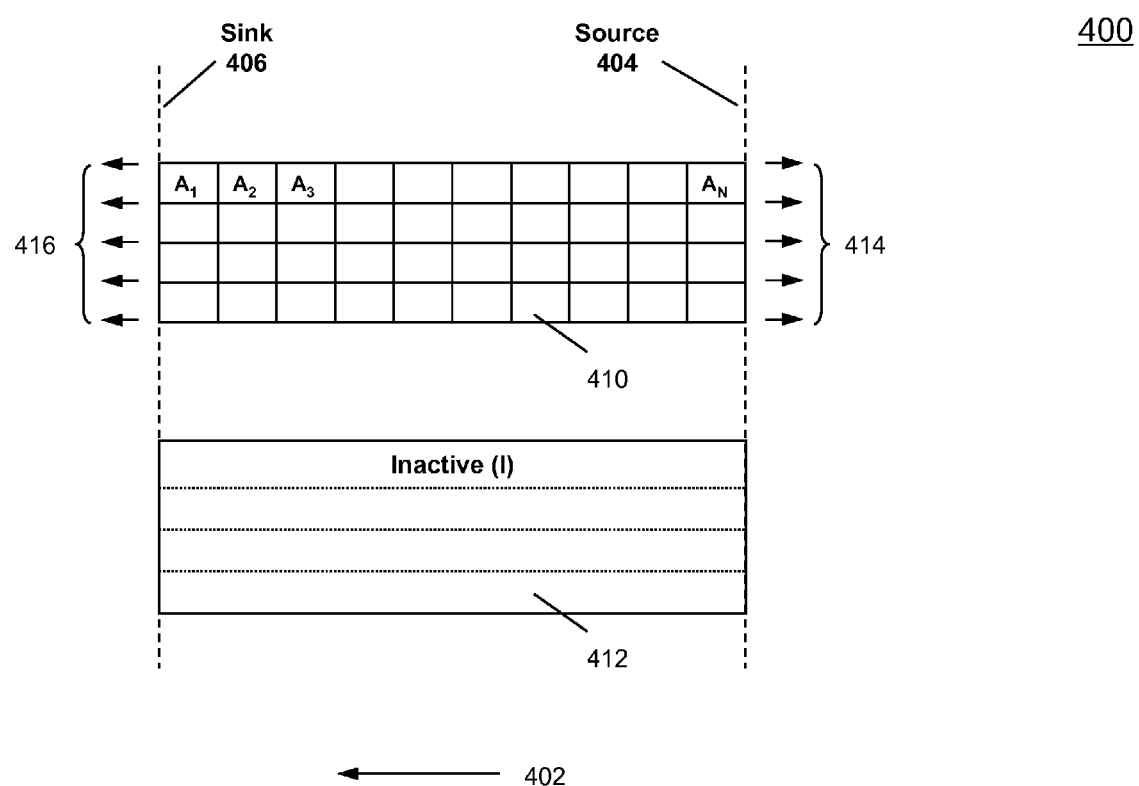
FIG. 4A is a diagram showing an exemplary continuous finite element mesh between a source and a sink including active and inactive elements in accordance with one embodiment of the present invention.

FIG. 4A is a diagram 400 showing an exemplary continuous finite element mesh between a source 404 and a sink 406 including active and inactive elements in accordance with one embodiment of the present invention. The shapeable materials of interest are represented by a substantially regular spaced rectangular FEA mesh 410. The mesh 410 comprises N columns and M rows. N and M are positive integers. For illustrative simplicity, there are only four rows in the mesh 410. The elements in the mesh 410 are designated as active initially. Each column of elements is referred to as $A_1$ column, $A_2$ column, $A_3$ column, . . . , $A_N$ column, respectively. The shapeable materials of interest are located and moved from a source or incoming location 404 to a sink or outgoing location 406 in direction 402. In contrast to the traditional approach, the presenting invention creates a column of fictitious elements 412 between the sink 406 and the source 404 to make the mesh 410 continuous. The additional elements 412 are denoted as 'I column' and designated as inactive initially. The shapeable materials are held in tension between two sides 414 and 416 of the mesh 410 as nodal boundary conditions initially. A FEA solution of the active elements is computed according to the loadings and nodal boundary conditions at each solution cycle. The inactive elements are not included in the solution thus not computed not updated. The inactive elements are treated as if there were not existed.

Figure 4B:
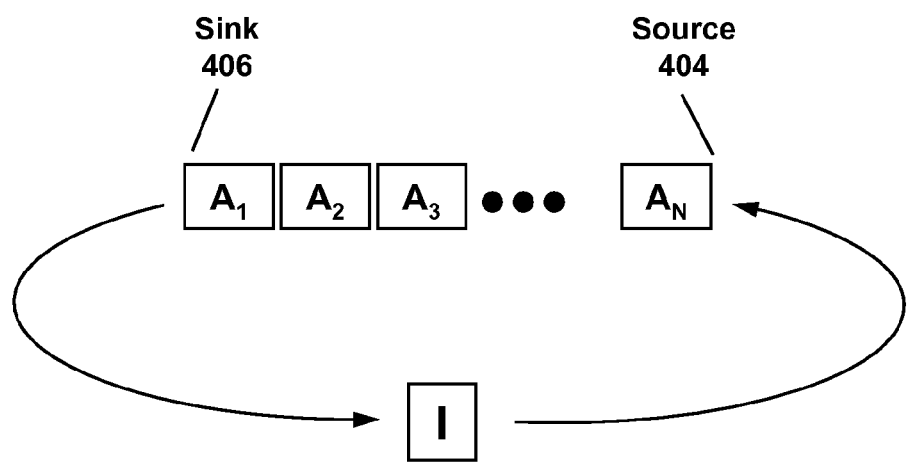
FIG. 4B is a diagram showing the rotation sequence between the active and inactive elements in accordance with one embodiment of the present invention.

The rotation sequence between the active and inactive elements is shown in a diagram 440 of FIG. 4B in accordance with one embodiment of the present invention. Instead of activating and deactivating elements as the simulation goes on, the continuous mesh of FIG. 4A allows a rotation between the active elements: $A_1$ column, $A_2$ column, . . . , and $A_N$ column, and inactive elements: I column. As the mesh 410 has traveled substantially passed the sink 406, the inactive column (i.e., I column) is rotated in and emerged from the source 404 as active elements. The lead or $A_1$ column becomes inactive as if the $A_1$ column of elements dropped into the sink 406. The nodal boundary conditions are adjusted accordingly after each rotation. The detailed rotation sequence is depicted in FIGS. 5A-5E.

Figure 5A:
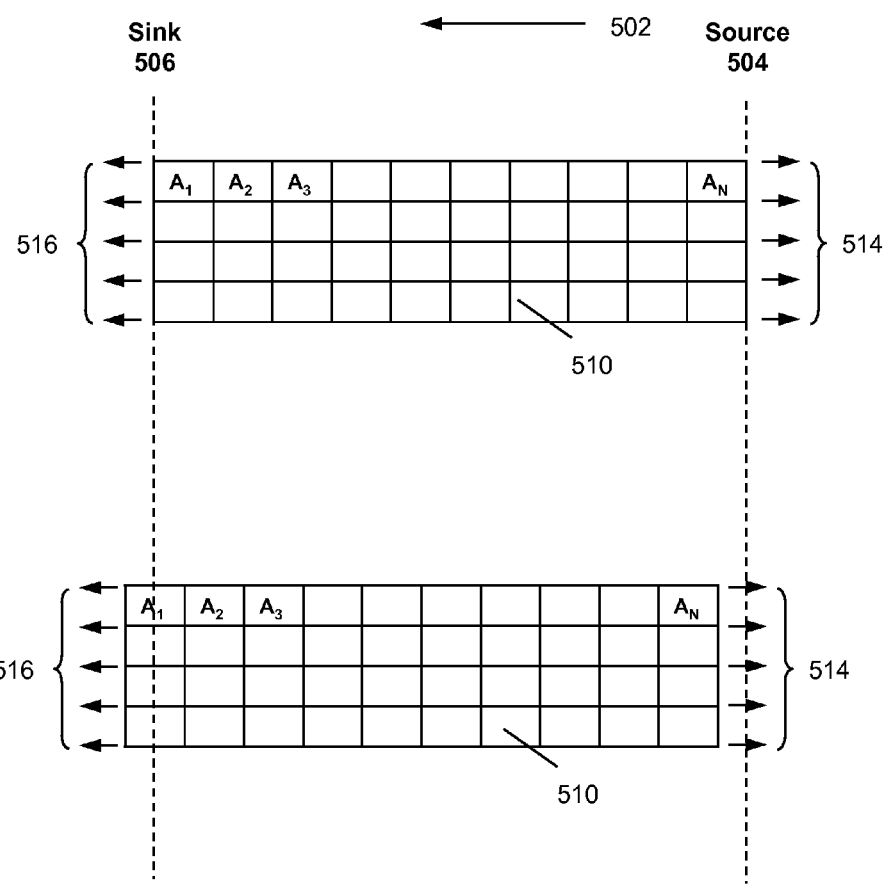
Figure 5B:
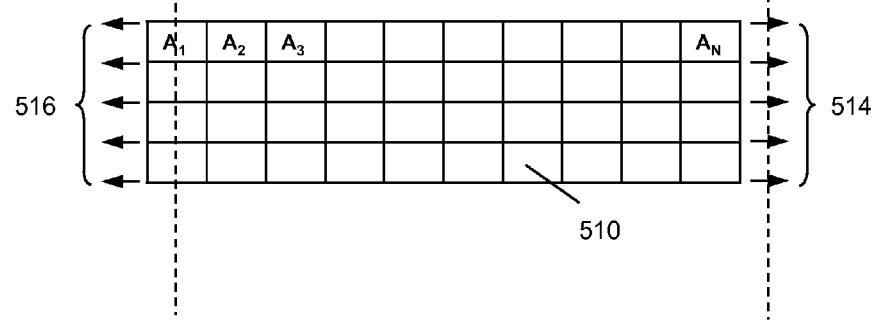

FIGS. 5A-5E show a sequence of finite element meshes demonstrating an element rotation operation during a simulation of an exemplary manufacturing process of shapeable materials in accordance with one embodiment of the present invention. In this embodiment, the shapeable materials on interest are traveled in a direction indicated by the arrow 502, which is from a source 504 and a sink 506. The materials are represent by a FEA mesh 510 (i.e., mesh 410 of FIG. 4A) of active elements and a column of inactive elements (not shown). The tensions are represented by nodal boundary conditions applied at the two sides 514 and 516 of the mesh 510 initially as shown in FIG. 5A. FIG. 5B shows the mesh 510 has traveled about a half of the averaged length of the active elements. In other words, the $A_1$ column has moved passed the sink 506 by about a half of the averaged length of the active elements in the mesh 510. As seen in FIG. 5B, the mesh 510 still represents the shapeable materials properly, the simulation can be performed further with the mesh 510. As the simulation moves on to a sequence as shown in FIG. 5C, the mesh 510 has traveled to a distance substantially equal to the averaged length of the active elements. The distance can be pre-defined by users (e.g., a specific percentage of the averaged length). In one embodiment, the specific percentage is 95%. As a result, the $A_1$ column has almost moved passed the sink 506. The $A_2$ column has moved to a position where the initial position of the $A_1$ column used to be. Instead of constantly deactivating and activating elements in the tradition approach, this condition triggers an element rotation operation in the present invention. The inactive elements (i.e., I column) are rotated in and activated at the source 504, and the lead or $A_1$ column of elements is deactivated to inactive at the sink 506 as shown in FIG. 5D. The nodal boundary conditions 524 and 526 representing the tensions are moved accordingly to reflect the element rotation. Finally, the newly emerged elements (i.e., $A'_1$ column) at the source 504 are assigned the properties as well the states (e.g., displacements, forces, etc.) of the last or $A_N$ column as shown in FIG. 5E. The simulation can then be carried on with new mesh 520. Another element rotation operation will be embarked, when the new lead column has traveled passed the sink 506. The simulation continues until a stead state solution has been reached. Active elements are included in a contact algorithm of the simulation while inactive elements are excluded. Therefore, only the active elements are computed during the simulation.

Figure 6:
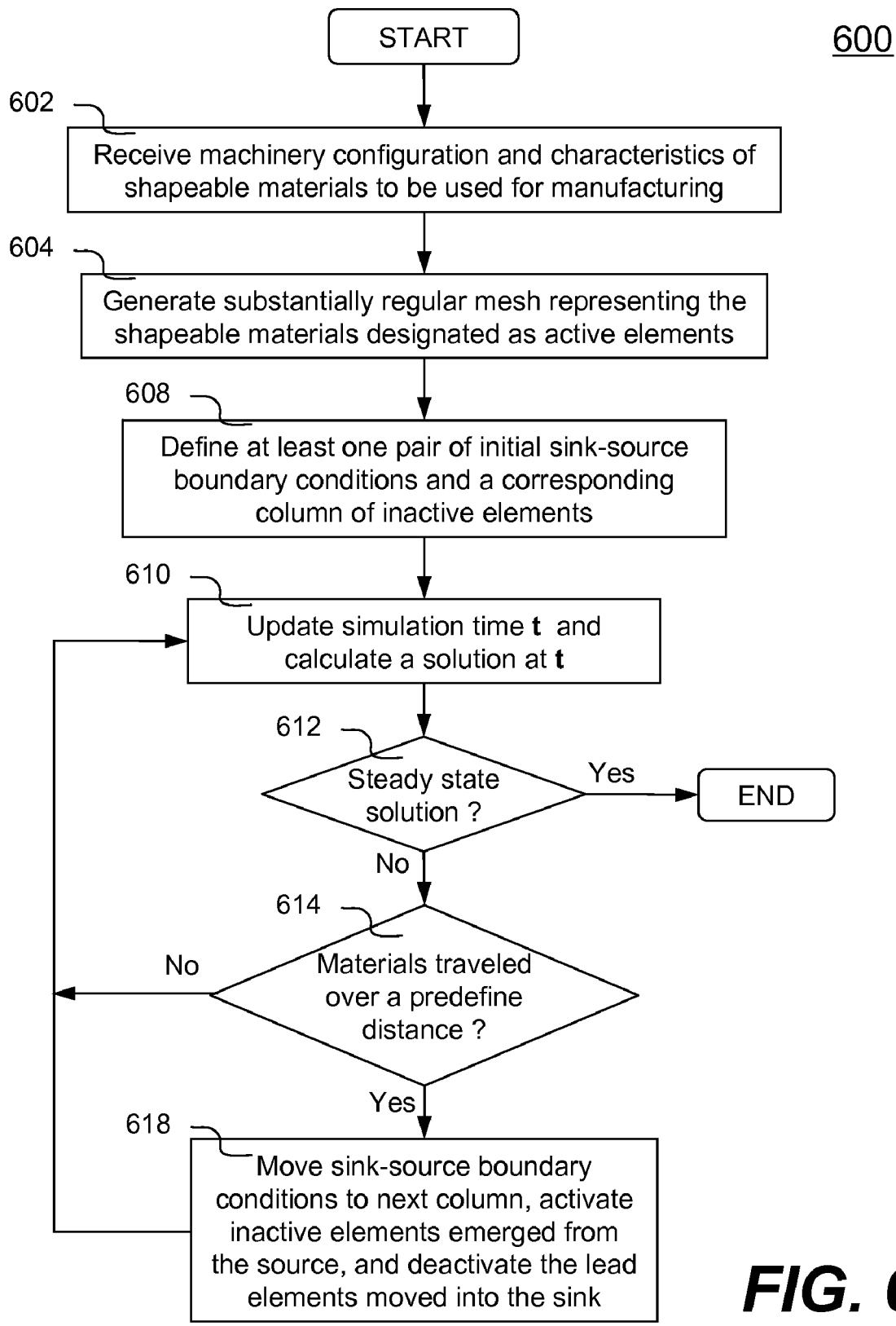
FIG. 6 is a flow chart showing the process for efficient simulating manufacturing process of shapeable material using finite element analysis in accordance with one embodiment of the present invention.

FIG. 6 is a flow chart showing the method 600 for efficient simulating manufacturing process of shapeable material using finite element analysis in accordance with one embodiment of the present invention. The process 600 is preferably understood in conjunction with the previous figures especially FIGS. 4A to 5E. The method 600 starts with receiving user definitions of the machinery along with shapeable materials used in a manufacturing process to be simulated at 602. The configuration of the machinery (e.g., locations of rollers, etc.) and characteristics of the shapeable materials (e.g., type, width, etc.) are defined. At 604, a finite element mesh (e.g., mesh 410 of FIG. 4A) of active elements is generated based on the definitions from users at 602. The FEA mesh includes substantially equal sized shell elements. In one embodiment, the rectangular mesh comprises N columns and M rows of quadrilateral shell elements. N and M are positive integers. Each of the elements is substantially similar sized. The longitudinal direction of the shapeable materials moves along with the manufacturing process of the machinery. The longitudinal direction is divided into columns. The size of the elements in the longitudinal direction is referred to as their length. The transverse direction is divided into rows and referred to as the width. Next at 608, the method 600 defines at least one pair of sink and source location in the initial configuration. Each pair of the sink and the source represents a portion of shapeable materials of interest in the manufacturing process. The materials between each of the at least one pair of sink and source are held in tension. The tension is represented by nodal boundary conditions in the finite element analysis. A column of additional fictitious elements is created to make the FEA mesh continuous by linking the sink and the source. The additional fictitious elements are designated as inactive initially while the elements defined at 604 are designated as active. Next at 610, the method 600 calculates a solution at the current solution cycle at simulation time t, which is initially set to zero and updated at each solution cycle of the finite element analysis. The method 600 moves a test 612, in which the solution obtained at 610 is examined to determine whether a steady state has been reached. If the test 612 is true, the objective of the simulation has been achieved and the method 600 ends. Otherwise, the method 600 follows 'No' branch moving to another test 614 for checking if the shapeable materials have traveled more than a predefined distance. In one embodiment, the pre-defined distance is an averaged length of the active elements between a pair of sink and source. If the test 614 is false, the method 600 follows the 'No' branch back to 610 to update the simulation time t and calculate another solution. Otherwise, the method 600 follows the Yes' branch to 618 to perform an element rotation operation: i) activate the column of inactive elements at the source, ii) copy all history data including stresses from the last column of the active elements to the newly activated elements, iii) deactivate the lead column of active elements into the sink so that they become inactive, and iv) move the boundary conditions to newly established boundary nodes at the sink and source as described in FIGS. 5D and 5E. Then the method 600 moves back to 610 to repeat the above described method until the test 612 becomes true and the method 600 ends.

Although an exemplary embodiment of invention has been disclosed, it will be apparent to those skilled in the art that various changes and modifications may be made to achieve the advantage of the invention. It will be obvious to those skilled in the art that some components may be substituted with another component providing the same function. The appended claims cover the present invention.

I claim:

1. A method of simulating a manufacturing process of shapeable materials using a finite element analysis (FEA), the method comprising:
   (a) receiving, in a computer having a FEA application module installed thereon, definitions of the machinery and the shapeable materials to be manufactured in the machinery;
   (b) creating a FEA model representing the shapeable materials, the FEA model contains a rectangular mesh having N columns and M rows of substantially similar sized active shell elements, wherein the rectangular mesh represents a particular section of the shapeable materials of interest in the machinery;
   (c) defining a sink and a source as respective boundaries of the rectangular mesh;
   (d) creating a column of inactive shell elements to connect the sink and the source such that the rectangular mesh becomes a continuously looping mesh;
   (e) updating a simulation time and calculating a solution at the simulation time in the FEA;
   (f) when said particular section in said simulating of the manufacturing process has traveled more than a predefined distance in the FEA, performing an element rotation operation between the active and the inactive shell elements at the sink and the source; and
   (g) repeating (e)-(f) until the solution of the FEA has reached a steady state showing a result of said simulating the manufacturing process to be used for assisting a user to make a decision in improvement of the manufacturing process.

2. The method of claim 1, wherein the shapeable materials may include, but not be limited to, paper, fabric, and sheet metal.

3. The method of claim 1, wherein N and M are positive integers.

4. The method of claim 1, wherein the shell elements are quadrilateral or triangular element.

5. The method of claim 1, wherein the particular section of the shapeable materials of interest is held in tension between the sink and the source.

6. The method of claim 5, wherein the tension is represented by a set of nodal boundary conditions applied at the sink and the source in the finite element analysis.

7. The method of claim 1, wherein the inactive shell elements are not included in the solution of the finite element analysis.

8. The method of claim 1, wherein the pre-defined distance is
   substantially equal to the averaged length of all of the active shell elements between the sink and the source.

9. The method of claim 1, wherein the pre-defined distance is equal to 95% of the averaged length of all of the active shell elements.

10. The method of claim 6, said performing the element rotation operation further comprising:
activating the inactive shell elements at the source;
copying all history data from the last column of active elements to the newly activated elements;
deactivating the lead column of the active elements at the sink so that the lead column becomes inactive; and
moving the set of nodal boundary conditions to newly established boundary nodes at the sink and the source.

11. The method of claim 10, wherein the history data includes element stresses data.

12. A computer recordable storage medium having computer readable code embodied in the medium for causing an application module to execute on a computer for simulating manufacturing process of shapeable materials using a finite element analysis (FEA) by a method comprising:
(a) receiving definitions of the machinery and the shapeable materials to be manufactured in the machinery;
(b) creating a FEA model representing the shapeable materials, the FEA model contains a rectangular mesh having N columns and M rows of substantially similar sized active shell elements, wherein the rectangular mesh represents a particular section of the shapeable materials of interest in the machinery;
(c) defining a sink and a source as respective boundaries of the rectangular mesh;
(d) creating a column of inactive shell elements to connect the sink and the source such that the rectangular mesh becomes a continuously looping mesh;
(e) updating a simulation time and calculating a solution at the simulation time in the FEA;
(f) when said particular section in said simulating of the manufacturing process has traveled more than a pre-defined distance in the FEA, performing an element rotation operation between the active and the inactive shell elements at the sink and the source; and
(g) repeating (e)-(f) until the solution of the FEA has reached a steady state showing a result of said simulating the manufacturing process to be used for assisting a user to make a decision in improvement of the manufacturing process.

13. The computer recordable storage medium of claim 12, wherein the shapeable materials of interest are held in tension between the sink and the source.

14. The computer recordable storage medium of claim 13, wherein the tension is represented by a set of nodal boundary conditions applied at the sink and the source in the finite element analysis.

15. The computer recordable storage medium of claim 12, said performing the element rotation operation further comprising:
activating the inactive shell elements at the source;
copying all history data from the last column of active elements to newly activated elements;
deactivating the lead column of the active elements at the sink so that the lead column becomes inactive; and
moving the set of nodal boundary conditions to the newly established boundary nodes at the sink and the source.

16. A system for simulating manufacturing process of shapeable materials using a finite element analysis (FEA), the system comprising:
an I/O interface;
a communication interface;
a secondary memory;
a main memory for storing computer readable code for an application module;
at least one processor coupled to the main memory, the secondary memory, the I/O interface, and the communication interface, said at least one processor executing the computer readable code in the main memory to cause the application module to perform operations of:
(a) receiving definitions of the machinery and the shapeable materials to be manufactured in the machinery;
(b) creating a FEA model representing the shapeable materials, the FEA model contains a rectangular mesh having N columns and M rows of substantially similar sized active shell elements, wherein the rectangular mesh represents a particular section of the shapeable materials of interest in the machinery;
(c) defining a sink and a source as respective boundaries of the rectangular mesh;
(d) creating a column of inactive shell elements to connect the sink and the source such that the rectangular mesh becomes a continuously looping mesh;
(e) updating a simulation time and calculating a solution at the simulation time in the FEA;
(g) when said particular section in said simulating of the manufacturing process has traveled more than a pre-defined distance in the FEA, performing an element rotation operation between the active and the inactive shell elements at the sink and the source; and
(g) repeating (e)-(f) until the solution of the FEA has reached a steady state showing a result of said simulating the manufacturing process to be used for assisting a user to make a decision in improvement of the manufacturing process.

17. The system of claim 16, wherein the particular section of the shapeable materials of interest is held in tension between the sink and the source.

18. The system of claim 17, wherein the tension is represented by a set of nodal boundary conditions applied at the sink and the source in the finite element analysis.

19. The system of claim 16, said performing the element rotation operation further comprising operations of:
activating the inactive shell elements at the source;
copying all history data from the last column of active elements to the newly activated elements;
deactivating the lead column of the active elements at the sink so that the lead column becomes inactive; and
moving the set of nodal boundary conditions to newly established boundary nodes at the sink and the source.

20. The system of claim 19, wherein the active shell elements are included in said simulating of the manufacturing process, while the inactive shell elements are excluded.

* * * * *